(12) United States Patent
Beringer

(10) Patent No.: US 8,010,419 B2
(45) Date of Patent: Aug. 30, 2011

(54) TRANSPARENT OBJECT IDENTITIES ACROSS AND OUTSIDE OF ERP SYSTEMS

(75) Inventor: Joerg Beringer, Los Altos, CA (US)

(73) Assignee: SAP AG, Waldorf (DE)

( * ) Notice: Subject to any disclaimer, the term of this patent is extended or adjusted under 35 U.S.C. 154(b) by 1278 days.

(21) Appl. No.: 11/648,519

(22) Filed: Dec. 29, 2006

(65) Prior Publication Data

US 2008/0157969 A1     Jul. 3, 2008

(51) Int. Cl.
*G06Q 10/00* (2006.01)

(52) U.S. Cl. ......................................................... 705/28

(58) Field of Classification Search .................... 705/28, 705/1.1; 340/572.1
See application file for complete search history.

(56) References Cited

U.S. PATENT DOCUMENTS

| | | | | |
|---|---|---|---|---|
| 2003/0085997 A1* | 5/2003 | Takagi et al. | ................. | 348/143 |
| 2006/0126451 A1* | 6/2006 | Shinkai et al. | ............... | 369/30.3 |
| 2006/0158533 A1* | 7/2006 | Brahmbhatt et al. | ...... | 348/231.2 |
| 2007/0055949 A1* | 3/2007 | Thomas | ........................ | 715/863 |
| 2007/0250466 A1* | 10/2007 | Imrapur et al. | ................... | 707/1 |
| 2007/0296581 A1* | 12/2007 | Schnee et al. | .............. | 340/572.1 |
| 2008/0052205 A1* | 2/2008 | Dolley et al. | .................... | 705/28 |

OTHER PUBLICATIONS

"Quantitative performance evaluation of RFID applications in the supply chain of the printing industry" Hou, Jiang-Liang, Industrial Management + Data Systems, 2006, v 106, pp. 96-120.*

* cited by examiner

*Primary Examiner* — Matthew S Gart
*Assistant Examiner* — Oluseye Iwarere
(74) *Attorney, Agent, or Firm* — Blakely Sokoloff Taylor & Zafman

(57) ABSTRACT

A transparent identification server receives an ID tag associated with a transferable business item from a domain-specific entity and allocates a virtual object ID for the transferable business item. The transparent identification server also receives artifact metadata tracking the activity of the transferable business item. The transparent identification server correlates artifact metadata with the virtual object ID.

20 Claims, 5 Drawing Sheets

TRANSPARENT OBJECT IDENTITIES ACROSS AND OUTSIDE OF ERP SYSTEMS

FIELD

Embodiments of the technology relate to object identities for business items and more particularly to transparently linking/correlating event information associated with business items to the object identities.

BACKGROUND

Electronic data records in ERP systems often represent physical products/items that are ordered, manufactured, owned, serviced, or sold. The association between such electronic data records and external physical objects is managed, if at all, by domain specific business applications (e.g., asset management for managing physical assets, warehouse applications for receiving and moving goods). Such applications use technology (e.g., Radio Frequency Identification (RFID) technology) to tag and identify physical objects. But each application is tracking such associations within its limited scope. In business-to-business (B2B) scenarios such representations are even distributed across different companies and potentially non-integrated ERP systems. A coherent tracking of physical items in a B2B scenario is only possible if all business partners are connected to the same supply chain management solutions.

For example, a line item (e.g., iPod Video) in an electronic order may correspond to an iPod being manufactured and personalized with customer logo, shipped by one carrier, distributed by another carrier, and finally used by the customer. In this scenario, the manufacturer, and the two carriers potentially have different electronic representations in their ERP systems, which all can be associated with the same physical item, in this example the iPod Video. With the introduction of technologies such as RFID, such external items become traceable by ERP systems.

Radio Frequency Identification (RFID) is an automatic identification method, that relies on storing and remotely retrieving data using devices called RFID tags. An RFID tag is an object that can be attached to or incorporated into a product, animal, or person for the purpose of identification using radio waves. Chip-based RFID tags contain silicon chips and antennas. Active RFID tags have a transmitter and a power source (e.g., a battery). The power source is used to run the microchip circuitry and send signals to an RFID reader. Passive RFID tags have no power source. Instead, they draw power from the reader, which sends out electromagnetic waves that induce a current in the tag's antenna. Active tags are useful for tracking high-value goods over longer ranges (e.g., over 100 ft. compared to 20 ft. or less), but they are often too expensive for use on low-cost items.

RFID systems are gaining in popularity and can be used almost anywhere, from clothing tags to car parts to electronics components to bulk product inventories, such as palettes, boxes and the like. However, current RFID systems are limited by their domain-specific solutions, which in turn limit integration of RFID information across and outside of business boundaries and domains. In other words, systems are generally customized to a particular company, or a particular environment of that company. Thus, information about products and objects having RFID tags is fragmented and difficult to synthesize due to the different RFID systems implemented, for example, at different points in a supply chain or product development chain.

With the establishment of RFID and related technologies (e.g., barcodes, etc.), the management of physical things outside of computer systems will be desirable. By supporting RFID tracking into ERP software applications, electronic systems start to track, manage, and recognize physical artifacts outside of the system. However, there is no general concept in place which treats an electronic data record and a physical artifact as two representations of the same business object. Transitions from system internal data representations (the order) to system external physical things (the manufactured good) are currently causing a disconnect unless custom applications are built to associate those external objects with the electronic data record. The scope of this tracking does usually not go across businesses.

SUMMARY

A transparent identification (TransID) server integrates and manages information related to business products/items. The TransID server receives system internal Unified Resource Identifiers (URIs) or system external identity tags associated with transferable business products/items. Included within the TransID server is a virtual object generator that generates a virtual object ID for any registered business object/item residing in an ERP system having a unique ID (e.g., barcode or RFID). The virtual object ID is stored in a database or in memory. The TransID server also receives information regarding events and/or activity associated with business products/items and stores the information as event history of virtual objects associated with this information. Event and/or activity information is correlated with respective virtual object IDs by a correlation agent. As used herein, the terms "correlating" and/or "correlated" refer to any type of logical association between information and objects. These terms are not used for purposes of limiting scope, but rather for simplicity of description. Object IDs and/or event information associated with virtual objects stored in the TransID server can be distributed across domain-specific boundaries, providing a transparent, integrated and comprehensive event history for business products/items. As used herein, the terms "distributing" and/or "distributed" refer any form of transmitting, sharing, and/or communicating information from a source to a destination. As used herein, the meaning of "event history" is also not restrictive; other terms such as "activity log" and/or "audit trail" may also be used to describe events and/or activities associated with business items.

BRIEF DESCRIPTION OF THE DRAWINGS

The following description includes discussion of various figures having illustrations given by way of example of implementations of embodiments of the technology. The drawings should be understood by way of example, and not by way of limitation.

DETAILED DESCRIPTION

Figure 1:
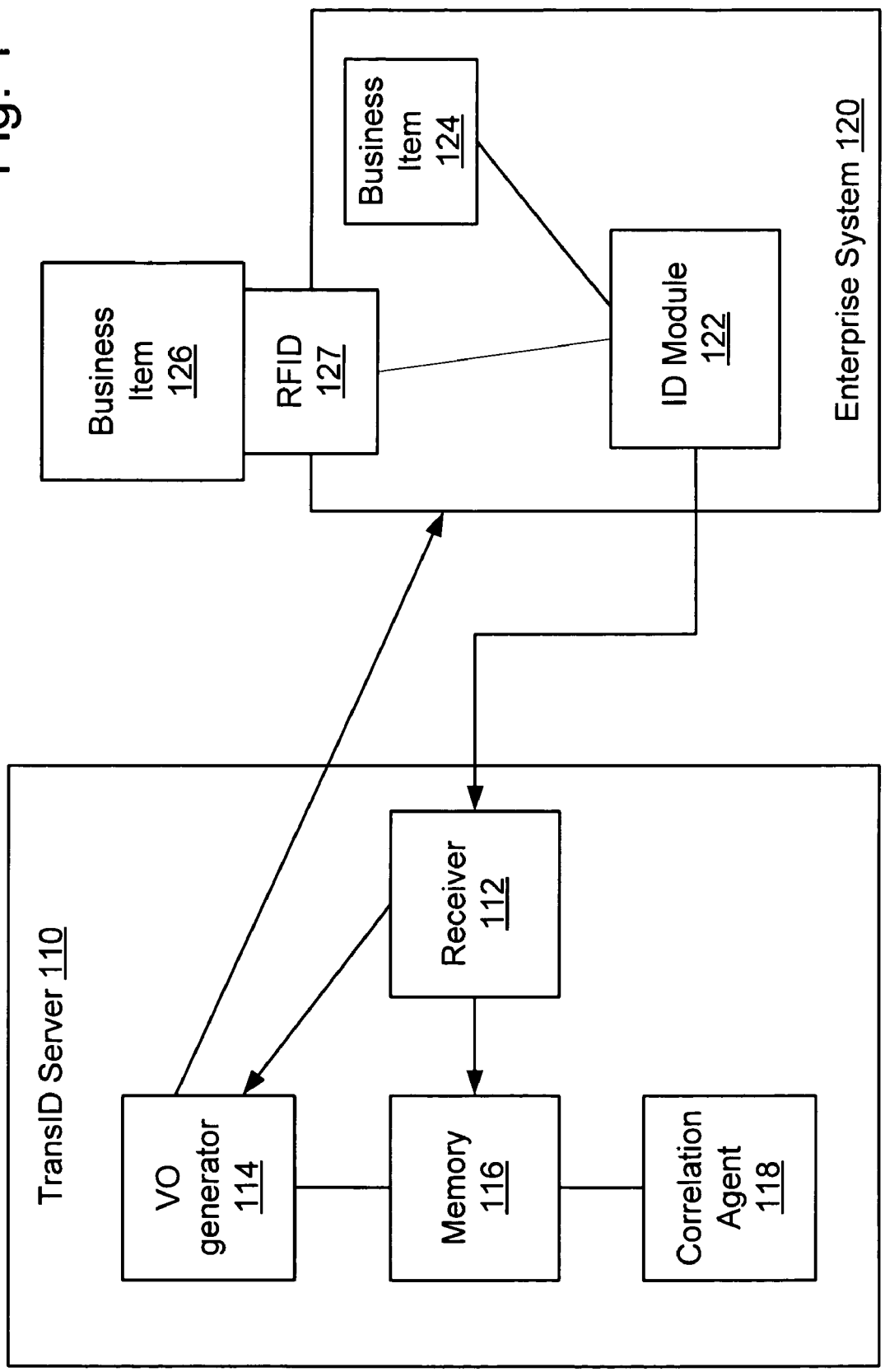
FIG. 1 is a block diagram illustrating an embodiment of a TransID server.

A transferable business item has an identity (ID) tag such as a Radio Frequency ID (RFID) tag or any other type of tag or ID. Embodiments are described herein as using RFID for ease and simplicity of description. However, one of skill in the art will appreciate those embodiments described using RFID are merely exemplary and that the scope of the technology described herein is not limited to such embodiments; other types of tagging and/or identification (e.g., barcodes, etc.) can just as easily be used in embodiments of the technology.

As used herein, a transferable business item refers to any transferable item or object used or potentially used by a business or organization, whether for profit or not. Examples of transferable items or objects include, but are not limited to, physical objects (e.g., baseball cards, books, toys, appliances, automobiles, food items, clothing, etc.) and electronic objects (e.g., electronic documents, data records, files, programs, applications, etc.)

In one embodiment, the ID tag for the transferable business item is domain-specific. As used herein, a domain-specific ID tag refers to an ID tag that is specific/unique to a particular source domain. For example, company X may employ a system that manages and tracks its warehouse inventory using RFID tags. This system, while potentially similar to systems used by other companies, is domain-specific—in other words, the system is tailored and customized to company X's needs, business practices and/or use of information technology. As used herein, a domain-specific tag refers to an identification tag that is customized to a particular company, or a particular environment of a company. For example, the tag may be customized specifically to address company X's business practices, IT practices, tracking model, etc. Customization to the tag may include, for example, a propriety or unique method of allocating and/or assigning RFID tags to products. The system may also utilize a specific set of rules, parameters and/or formats for monitoring, adding or updating information associated with one or more RFIDs. Thus, the utility of the data, records, information, etc., associated with company X's system is limited to company X, a business partner of company X, or an entity that uses compatible ID tagging.

A transparent identification (TransID) server can be used to overcome the limitations of the prior art. Companies desiring to exchange information associated with business items subscribe to a TransID service and send ID tags to a TransID server. As used herein, "subscribing" also refers to participating, registering for and/or facilitating the exchange (or simple receipt) of information associated with business items. In response, the TransID server allocates virtual object IDs for each of the business items. The virtual object IDs can then be used by entities, companies, and/or businesses participating in the TransID service to identify business items. In one embodiment, the virtual object IDs are stored on the TransID server. As used herein, "storing" also refers to maintaining, managing, and/or organizing virtual object IDs. In other embodiments, the virtual object IDs are stored remotely, on a computer-readable medium, or using any other type of data storage known in the art. TransID servers can be setup in a distributed way allowing any combination of central or local storage, and implementation of trust zones for managing what information is disclosed to whom.

Subscribing entities may also publish and/or send artifact metadata associated with business items to the TransID server. As used herein, artifact metadata refers to any type of event information that can be associated with a business item such as location information, transaction status, price, ownership, product type, relationship information, etc. For example, in a supply chain involving the manufacture and sale of tricycles, an RFID tag is created and attached to a tricycle upon manufacture. The manufacture of the tricycle constitutes an event—information for this event might include the manufacture date and manufacture location. The shipping of the tricycle (e.g., to a distributor) constitutes another event—information for this event might include date of shipment, destination, etc. The receipt of the tricycle by the distributor constitutes another event—information for this event might include a location update and/or a date of receipt of the tricycle. The sale of the tricycle by a retail store could be another event—information for this event might include the sales price, date of sale, etc. Note that an event may be broken down in any manner and that any of the above examples may represent multiple events. For example, a sale of a tricycle may have both a delivery event and a receipt of payment event; manufacture may include a frame-build event, a painting event, and a decaling event, etc.

The TransID server receives artifact metadata and correlates artifact metadata with virtual object IDs. In one embodiment, artifact metadata is stored on a TransID server behind the firewall of a company. In other embodiments, artifact metadata is stored remotely, on a hosted computer-readable storage medium, or using any other type of web service infrastructure and data storage known in the art. The correlating and/or association of artifact metadata with virtual object IDs can be accomplished in any manner known in the art such as using tables, linked lists, separate memory addresses and/or locations, etc.

Subscribing entities subscribe to be notified when the TransID receives event updates for particular virtual object IDs. In one embodiment, artifact metadata is distributed based on license level. For example, artifact metadata may be organized as a collection of envelopes linked to a virtual object ID. Each envelope includes a particular type of information. For example, one envelope might contain location information while another envelope contains transaction status, price, etc. The envelopes are available to subscribers according to their license level. A low level license might only allow a subscriber access to simple identity envelopes; a mid-level license might allow access to identity and location envelopes; and, a high-level license might allow access to identity, location, and other detailed business information associated with various business items.

License models may include trust zones and escalation procedures. Companies may prefer to run TransID servers behind their firewall and only expose limited information to central TransID servers to enable other business partners to track some events. In case of audits, call back procedures, or fraud, more information can be disclosed by license agreement to allow for a complete tracking of the event history of an item.

FIG. 1 illustrates an embodiment of the technology that includes a TransID server 110. Enterprise system 120 manages/maintains business items 124 and 126. Business item 126 can be a physical object such as a book, toy, appliance, food item, etc. Events and/or activities (e.g., location, business status, condition, etc.) of business item 126 are tracked by enterprise system 120 using an RFID tag 127 attached to business item 126. RFID 127 may be attached to business item 126 in any manner or method known in the art.

Enterprise system 120 also tracks events associated with business item 124, which, in one embodiment, is an electronic object such as an electronic document, file, application, program, etc. Business item 124 is tracked based on a tag or ID that is allocated, created and/or assigned within enterprise system 120 for business item 124. Thus, similar to a physical object (e.g., business item 126), events associated with business item 124—an electronic object—can be tracked, stored and/or updated.

ID module 122 manages and maintains IDs and artifact metadata related to the IDs for enterprise system 120. ID module 122 in FIG. 1 can be domain-specific, but it is not necessary for the ID module to be domain-specific. In other embodiments, the ID module can be generic or quasi-generic; also, the ID module is capable of using a form and/or format for IDs and/or events that is identical to the form and/or format used by TransID server 110. Furthermore, it is not necessary that IDs and artifact metadata associated with the IDs be maintained in the same module (e.g., module 122). IDs can be maintained in one module while artifact metadata is maintained in another module according to one embodiment.

ID module 122 communicates ID information for business items (e.g., business items 124 and 126) to TransID server 110. ID and artifact metadata can be sent to TransID server 110 separately or together. Information is received at TransID server 110 by receiver 112. ID information, which includes the actual ID number (and may also include other basic information describing the object associated with the ID), is passed to virtual object (VO) generator 114. VO generator 114 generates, assigns and/or allocates a virtual object IDs for the received ID information and communicates the virtual object IDs back to enterprise system 120. The virtual object IDs are also stored in memory 116.

Artifact metadata is also stored in memory 116. Correlation agent 118 correlates artifact metadata with virtual object IDs in memory 116. As used herein, "correlating" refers to any logical association between virtual object IDs and events. Artifact metadata that is correlated to a virtual object ID can be broken down into information categories, referred to herein as "envelopes." In one embodiment, different types of events are correlated to a virtual object ID as separate event envelopes. More specifically, an "envelope" refers to a logical and/or physical arrangement of artifact metadata.

In one embodiment, "location" information is stored in one envelope that is correlated to a virtual object ID while "business status" information (e.g., price, ownership, transactions, etc.) is stored in a different envelope that is also linked to the virtual object ID. In other embodiments, information can be separated into envelopes based on other factors such as dates, supply/demand, quantity, quality, etc. Thus, in various embodiments, information can be categorized, organized, stored, and/or linked using envelopes in such a way that any or all artifact metadata associated with a business object can be flexibly accessed.

Figure 2:
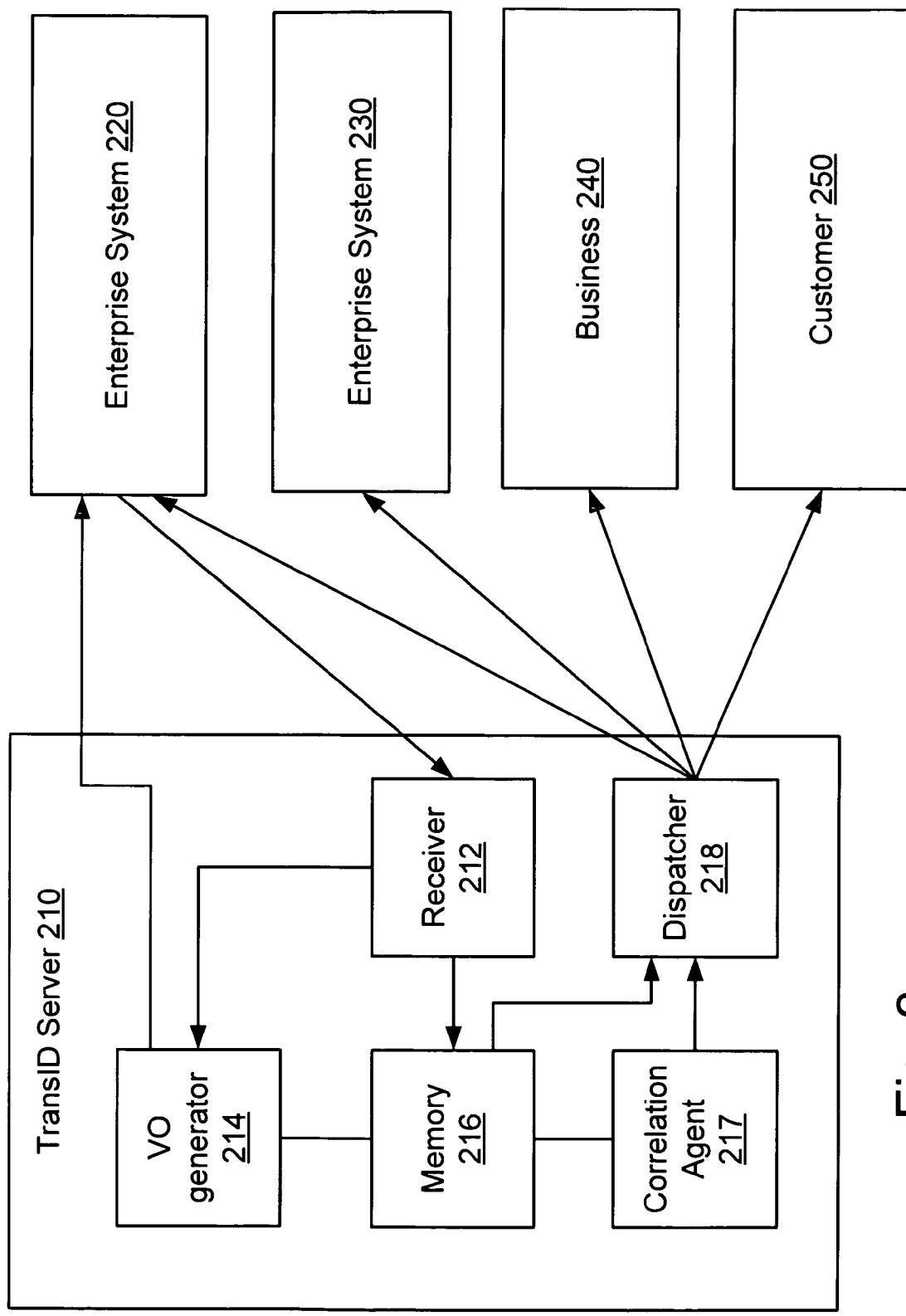
FIG. 2 is a block diagram illustrating another embodiment of a TransID server.

FIG. 2 illustrates another embodiment of the technology. TransID server 210 receives ID and artifact metadata from one or more enterprise systems, businesses or other entities (e.g. enterprise system 220). ID and artifact metadata can be received from the same entity or from different entities. In one example, ID information for a particular business item is received from one entity while artifact metadata for the same business item is received by the TransID server from one or more other entities. Both ID and artifact metadata are received by receiver 212. Receiver 212 passes ID information for the business item to virtual object generator 214. VO generator 214 generates a virtual object and/or ID for the business item. Once a virtual object has been created, the virtual object ID is communicated back to enterprise system 220 (e.g., via the body of an email, XML, metadata, etc.).

In one embodiment, virtual object IDs are stored in memory 216. Any subsequent artifact metadata associated with a business item having a virtual object ID is received by receiver 212 and passed to memory 216. While memory 216 is shown within TransID server 210 in FIG. 2, memory 216 could be external to TransID server 210 in another embodiment. Artifact metadata and virtual object IDs are linked/correlated by correlation agent 217. Artifact metadata is stored, categorized and/or linked based on the event type. Each event type for a virtual object is assigned a separate envelope. Thus, in one example, location events (e.g., moving the business item from one warehouse to another warehouse) for a virtual object are all stored in a location envelope. The envelope is linked to the virtual object. In another example, pricing events (e.g., sale price to distributor, wholesaler, retailer, customer, etc.) are stored in a pricing envelope. The pricing envelope is also linked to the virtual object. In general, there is no limit to the number or type of envelopes that can be linked to a virtual object.

Information stored in TransID server 210 can be sent to various entities automatically or upon request. A requesting entity, as used herein, includes any business entity, organization, enterprise system, customer, individual, etc., that requests information regarding one or more business items that have or will have a virtual object ID stored in TransID server 210. A requesting entity subscribes to a service to receive ID and/or event information. For example, a subscriber can receive access to information based on a subscription and/or license level. In one embodiment, ID envelopes (e.g., basic ID information) might be available for free or to low-level licensees. Increasingly valuable envelope types may require increasingly higher level licenses. For example, a low level license might only allow a subscriber access to simple identity envelopes; a mid-level license might allow access to identity and location envelopes; and, a high-level license might allow access to identity, location, and other detailed business information associated with various business items. Thus, different tiers of information are available to different tiers of subscribers.

Entities submitting ID and/or artifact metadata for a particular business item automatically receive corresponding virtual object ID and event envelope information for the business item from TransID server 210. Submitting entities can use this virtual object information locally for their own purpose(s) without continued communication with TransID server 210. However, access and use of any related/associated event and/or ID information originating outside of a submitting entity's system requires a subscription and/or a license to use the TransID service. In other words, the original source of ID information for a business item does not need a subscription to receive the corresponding virtual object ID information associated with the business item. However, if an outside entity (different from the original source entity) sends new artifact metadata associated with the virtual object to the TransID server, the original source entity needs to acquire the appropriate license to access the new/updated artifact metadata.

TransID server 210 includes a dispatcher 218 to notify requesting entities (e.g., enterprise system 230, business 240, customer 250, etc.) of artifact metadata updates based on license level. For example, if business 240 has a high-level license, then dispatcher 218 may send artifact metadata for all envelopes associated with a particular business item to business 240. Meanwhile, if customer 250 has a low-level license, dispatcher 218 may only send ID envelope information to customer 250. Information can be sent by dispatcher 218 in any variety of forms and/or formats (email, metadata, XML, etc.).

Figure 3:
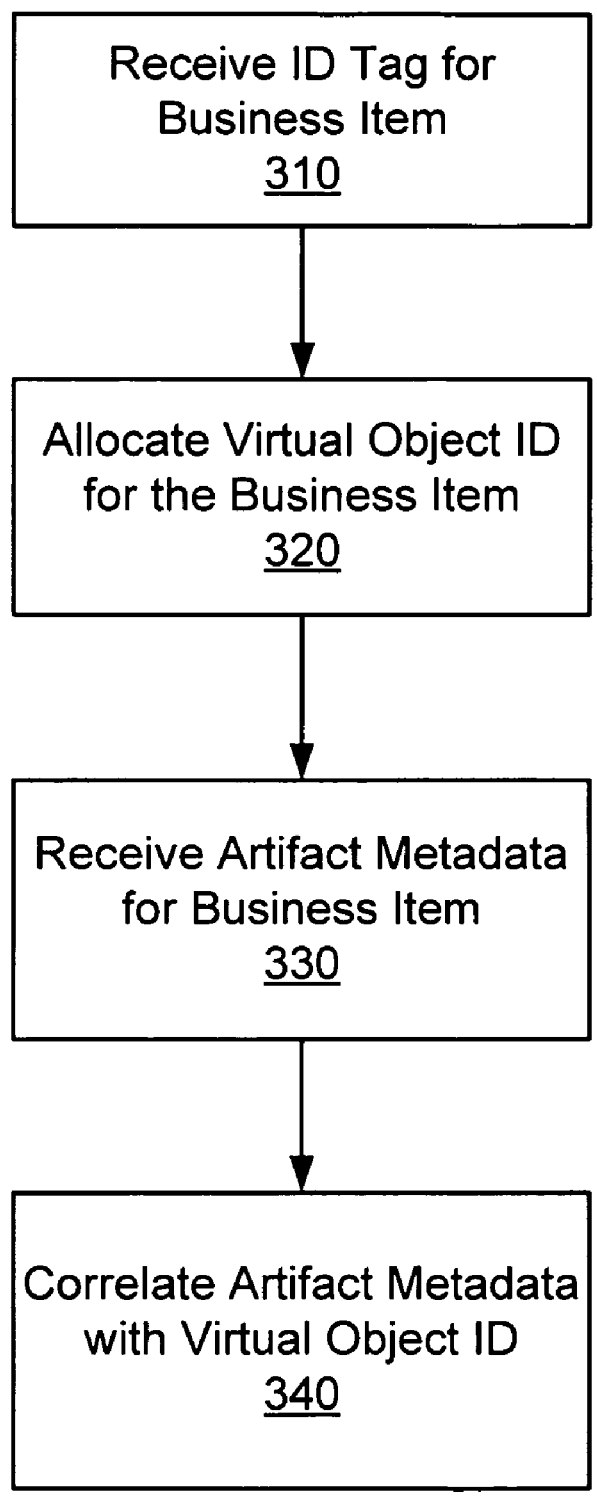
FIG. 3 is a flow diagram of an embodiment of the technology.

FIG. 3 is a flow diagram illustrating an embodiment. A TransID server receives an ID tag for a business item 310. The business item can be a physical object or an electronic object (e.g., file, application, data, program, etc.). For a physical object, the ID tag could be an RFID tag. Once the ID tag has been received, the TransID server allocates a virtual object ID for the business item 320. The virtual object ID serves as a universal ID that can be communicated across and outside of domain-specific boundaries, facilitating the exchange of data and product information for business items between de-centralized systems.

The TransID server also receives artifact metadata associated with business items 330. The artifact metadata is linked/correlated with specific virtual object IDs 340. Thus, the TransID server maintains a comprehensive activity log for business items.

Figure 4:
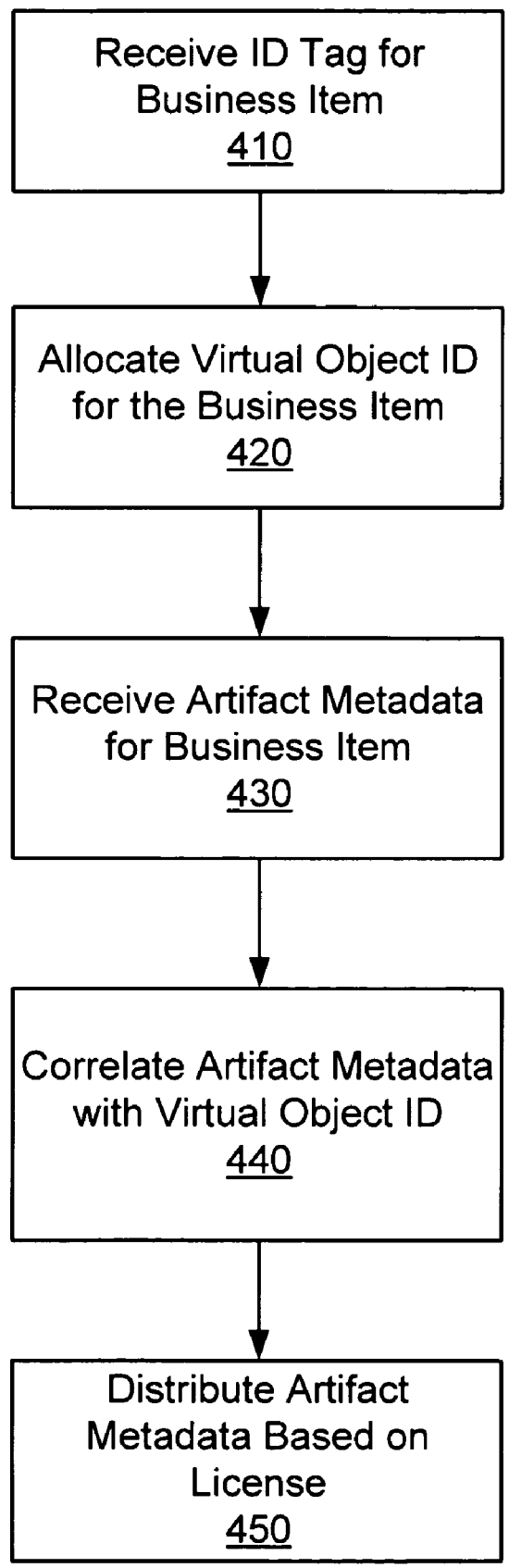
FIG. 4 is another flow diagram of an embodiment of the technology.

FIG. 4 illustrates another embodiment. A server (e.g., a TransID server) receives an ID tag for a business item 410. The business item can be a physical object or an electronic object (e.g., file, application, data, program, etc.). For a physical object, the ID tag could be an RFID tag. Once the ID tag has been received, the TransID server allocates a virtual object ID for the business item 420. The virtual object ID serves as a universal ID that can be communicated across and outside of domain-specific boundaries, facilitating the exchange of data and product information for business items between de-centralized systems.

The TransID server also receives artifact metadata associated with business items 430. The artifact metadata is linked/correlated with specific virtual object IDs 440. Artifact metadata is distributed to one or more entities based on a license level 450. In one embodiment, ID envelopes (e.g., basic ID information) might be available for free or to low-level licensees. Increasingly valuable envelope types may require increasingly higher level licenses. For example, a low level license might only allow a subscriber access to metadata for simple identity envelopes; a mid-level license might allow access to metadata for identity and location envelopes; and, a high-level license might allow access to metadata for identity, location, and other detailed business information associated with various business items. Thus, different tiers of information are distributed to different tiers of subscribers.

Figure 5:
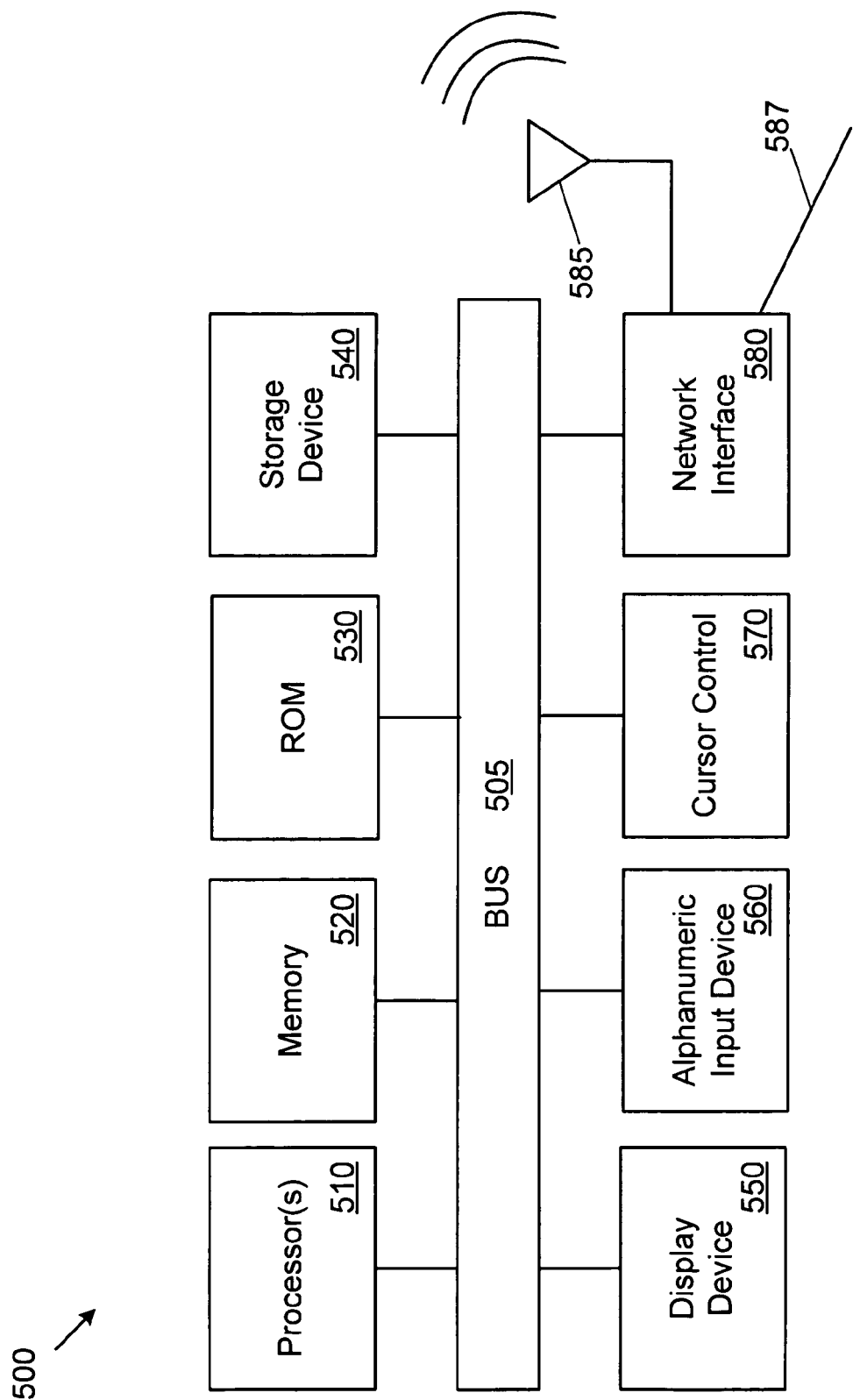
FIG. 5 is a block diagram of an embodiment of an electronic system.

FIG. 5 is a block diagram of one embodiment of an electronic system. The electronic system illustrated in FIG. 5 is intended to represent a range of electronic systems (either wired or wireless) including, for example, desktop computer systems, laptop computer systems, cellular telephones, personal digital assistants (PDAS) including cellular-enabled PDAs, set top boxes. Alternative electronic systems may include more, fewer and/or different components.

Electronic system 500 includes bus 505 or other communication device to communicate information, and processor 510 coupled to bus 505 that may process information. While electronic system 500 is illustrated with a single processor, electronic system 500 may include multiple processors and/or co-processors. Electronic system 500 further may include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Electronic system 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to electronic system 500.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate direction information and command selections to processor 510 and to control cursor movement on display 550.

Electronic system 500 further may include network interface(s) 580 to provide access to a network, such as a local area network. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface(s) 580 may provide access to a local area network by conforming to IEEE 802.16 standards. IEEE 802.16 corresponds to IEEE 802.15-2005 entitled "Air Interface for Fixed Broadband Wireless Access Systems" approved Dec. 7, 2005 as well as related documents.

In one embodiment, network interface(s) 580 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 580 may provide wireless communications using, for example, Time Division, Multiple Access (TDMA) protocols, Global System for Mobile Communications (GSM) protocols, Code Division Multiple Access (CDMA) protocols, and/or any other type of wireless communications protocol.

Embodiments of the technology described above may include hardware, software, and/or a combination of these. In a case where an embodiment includes software, the software data, instructions, and/or configuration may be provided via an article of manufacture by a machine/electronic device/hardware. An article of manufacture may include a machine or computer accessible/readable medium having content to provide instructions, data, etc. The content may result in an electronic device performing various operations or executions described. A machine accessible medium includes any mechanism that provides (i.e., stores and/or transmits) information/content in a form accessible by a machine (e.g., computing device, electronic device, electronic system/sub-system, etc.). For example, a machine or computer accessible medium includes recordable/non-recordable media such as read only memory (ROM), random access memory (RAM), magnetic disk storage media, optical storage media, flash memory devices, etc. The machine accessible medium may further include an electronic device having code loaded on a storage that may be executed when the electronic device is in operation. Thus, delivering an electronic device with such code may be understood as providing the article of manufacture with such content described above.

As used herein, references to one or more "embodiments" are to be understood as describing a particular feature, structure, or characteristic included in at least one implementation of the technology. Thus, phrases such as "in one embodiment" or "in an alternate embodiment" appearing herein describe various embodiments and implementations of the technology, and do not necessarily all refer to the same embodiment. However, they are also not necessarily mutually exclusive.

Besides what is described herein, various modifications may be made to the disclosed embodiments and implementations of the technology without departing from their scope. Therefore, the illustrations and examples herein should be construed in an illustrative, and not a restrictive sense. The scope of the invention should be measured solely by reference to the claims that follow.

What is claimed is:

1. A method, comprising:
receiving, at a receiver of a processor based system, an identification (ID) tag associated with a transferable business item from a first domain-specific entity, wherein the first domain-specific entity corresponds to a first association between electronic data records and domain specific business applications for the first domain-specific entity that is distinct from a second association between electronic data records and domain specific business applications for a second domain-specific entity, and wherein the ID tag is unique to the first domain-specific entity and customized with parameters and formats specific to a particular business environment of the first domain-specific entity including business practices and tracking models for the first domain-specific entity;
allocating a virtual object ID for the transferable business item in response to receiving the domain-specific ID tag, wherein the virtual object ID serves as a universal ID that can be communicated across and outside of domain-specific boundaries of the first domain-specific entity, to exchange data associated with the transferable business item between de-centralized systems of the first domain-specific entity and the second domain-specific entity, the virtual object ID not including the parameters and formats specific to business practices of the first domain-specific entity;
receiving, at the receiver of the processor based system, artifact metadata associated with the transferable business item, wherein the artifact metadata tracks activity of the transferable business item from either of the first or the second domains; and
associating, via a correlation agent of the processor based system, the artifact metadata with the virtual object ID.

2. The method of claim 1, wherein the ID tag is selected from the group consisting of a radio frequency identification (RFID) tag and a unified resource identifier (URI).

3. The method of claim 1, further comprising sending information regarding the transferable business item to a requesting entity.

4. The method of claim 3, wherein sending information regarding the transferable business item further comprises sending information regarding the transferable business item to a requesting entity based at least in part on a license level associated with the requesting entity.

5. The method of claim 3, wherein sending information regarding the transferable business item comprises:
updating artifact metadata associated with the transferable business item; and
automatically sending the updated information regarding the transferable business item to a requesting entity.

6. The method of claim 1, wherein receiving the domain-specific ID tag associated with the transferable business item comprises:
receiving a domain-specific ID tag associated with at least one object from the group consisting of a physical object and an electronic object.

7. A processor based electronic server, comprising:
a receiver to receive a domain-specific identity (ID) tag associated with a transferable business item from a first domain-specific entity and to receive artifact metadata for the transferable business item, wherein the first domain-specific entity corresponds to a first association between electronic data records and domain specific business applications for the first domain-specific entity that is distinct from a second association between electronic data records and domain specific business applications for a second domain-specific entity, and wherein the ID tag is unique to the first domain-specific entity and customized with parameters and formats specific to a particular business environment of the first domain-specific entity including business practices and tracking models for the first domain-specific entity, and wherein the artifact metadata tracks activity of the transferable business item from either of the first or the second domains;
a virtual object generator coupled with the receiver to generate a virtual object ID for the domain-specific ID tag in response to receiving the domain-specific ID tag, wherein the virtual object ID serves as a universal ID that can be communicated across and outside of domain-specific boundaries of the first domain-specific entity, to exchange data associated with the transferable business item between de-centralized systems of the first domain-specific entity and the second domain-specific entity, the virtual object ID not including the parameters and formats specific to business practices of the first domain-specific entity; and
a correlation agent coupled with the virtual object generator to correlate the artifact metadata to the virtual object ID.

8. The processor based electronic server of claim 7, wherein the domain-specific ID tag corresponds to at least one of a system internal globally unique identifier (GUID) and a physical tag associated with the transferable business item.

9. The processor based electronic server of claim 7, further comprising a dispatcher coupled to the memory and the correlation agent to send information regarding the transferable business item, including the virtual object ID for the transferable business item, to a requesting entity.

10. The processor based electronic server of claim 9, wherein the information regarding the transferable business item comprises artifact metadata.

11. The processor based electronic server of claim 10, wherein the dispatcher sends artifact metadata regarding the transferable business item to a requesting entity based at least in part on a license level associated with the requesting entity.

12. The processor based electronic server of claim 7, wherein artifact metadata comprises information for at least one event from the group consisting of an item location event, an item transaction event, and an item relationship event.

13. The processor based electronic server of claim 7, wherein the transferable business item comprises at least one object selected from the group consisting of a physical object and an electronic object.

14. An article of manufacture comprising a computer-readable medium having content stored thereon to provide instructions to result in an electronic device performing operations including:
  receiving a domain-specific identity (ID) corresponding to a transferable business item from a first domain-specific entity, wherein the first domain-specific entity corresponds to a first association between electronic data records and domain specific business applications for the first domain-specific entity that is distinct from a second association between electronic data records and domain specific business applications for a second domain-specific entity, and wherein the ID tag is unique to the first domain-specific entity and customized with parameters and formats specific to a particular business environment of the first domain-specific entity including business practices and tracking models for the first domain-specific entity;
  assigning a virtual object ID to represent the domain-specific ID in response to receiving the domain-specific ID tag, wherein the virtual object ID serves as a universal ID that can be communicated across and outside of domain-specific boundaries of the first domain-specific entity, to exchange data associated with the transferable business item between de-centralized systems of the first domain-specific entity and the second domain-specific entity the virtual object ID not including the parameters and formats specific to business practices of the first domain-specific entity;
  receiving an event envelope for the transferable business item, wherein the event envelope includes information to track activity of the transferable business item from either of the first or the second domains; and
  correlating the envelope with the virtual object ID.

15. The article of manufacture of claim 14, wherein receiving the domain-specific ID comprises receiving at least one of a radio frequency identification (RFID) tag and a uniform resource identifier (URI) corresponding to the transferable business item.

16. The article of manufacture of claim 14, further having content to provide instructions to result in the electronic device performing additional operations including sending envelope information regarding the transferable business item to a requesting entity.

17. The article of manufacture of claim 16, having further content to provide instructions to result in an electronic device performing additional operations including sending information regarding the transferable business item to a requesting entity based at least in part on a license level associated with the requesting entity.

18. The article of manufacture of claim 16, wherein sending information regarding the transferable business item to the requesting entity comprises automatically sending information regarding the transferable business item to the requesting entity in response to updating the event envelope corresponding to the transferable business item.

19. The article of manufacture of claim 14, wherein receiving a domain-specific ID corresponding to a transferable business item comprises receiving a domain-specific ID corresponding to at least one object from the group consisting of a physical object and an electronic object.

20. The method of claim 1, wherein the processor based system comprises a TransID server.

* * * * *